UNITED STATES PATENT OFFICE.

PAUL EHRLICH AND ALFRED BERTHEIM, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

AMINOOXYARYLARSENOXIDS AND PROCESS OF MAKING SAME.

1,002,243.     Specification of Letters Patent.     Patented Sept. 5, 1911.

No Drawing.    Application filed October 26, 1910.    Serial No. 589,162.    (Specimens.)

*To all whom it may concern:*

Be it known that we, PAUL EHRLICH, M. D., professor of medicine, and ALFRED BERTHEIM, Ph. D., citizens of the Empire of Germany, residing at Frankfort-on-the-Main, Germany, have invented certain new and useful Improvements in Aminooxyarylarsenoxids and Processes of Making Same, of which the following is a specification.

According to the process described in German Patent No. 224,953, there are obtained compounds of therapeutic value by treating the oxyarylarsenic acids with weak reducing agents, whereby oxyarylarsenoxids are produced. Now we have found that the therapeutic action of the said compounds is considerably increased in their amino derivatives and that these aminooxyarylarsenoxids are obtained by treating amino derivatives of the oxyarylarsenic acids with weak reducing agents.

The following example illustrates the invention:

*Aminooxyphenylarsenoxid.*—234 gr. of aminooxyphenylarsenic acid, obtainable as described in German Patent No. 224,953, are dissolved in 1.5 liters of water and 1.3 liters of diluted sulfuric acid (1:5). To this solution 50 gr. of potassium iodid are added and the whole is saturated at ordinary temperature with sulfurous acid. Concentrated aqueous ammonia is then added while slightly stirring and well cooling, until there is a strong alkaline reaction. When the acid has become neutralized, the aminooxyphenylarsenoxid separates in the form of a microcrystalline and nearly white precipitate; by addition of common salt the precipitation may be completed. The new product is then filtered off, repeatedly washed with a saturated solution of common salt and dried *in vacuo* in presence of sulfuric acid.

The formation of the aminooxyphenylarsenoxid may be represented by the equation:

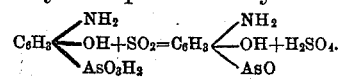

The aminooxyphenylarsenoxid is slightly soluble in water, very readily soluble in aqueous mineral acids and in caustic soda lye as well as in methyl-alcohol, scarcely soluble in ether, and insoluble in benzene. It yields when treated with hydrogen-peroxid, amino-oxy-aryl-arsenic acids, and when treated with strong reducing agents, such as hydrosulfite, diaminodioxyarsenobenzene.

Having now described our invention, what we claim is:

1. As new products, the amino derivatives of oxyarylarsenoxids, being whitish crystalline powders, scarcely soluble in water, readily dissolving in diluted mineral acids, and caustic soda lye, also in methyl-alcohol, but scarcely soluble in ether and insoluble in benzene; yielding when treated with hydrogen-peroxid amino-oxy-arylarsenic acid.

2. As a new product, the aminooxyphenylarsenoxid, being a whitish crystalline powder, scarcely soluble in water, readily soluble in diluted mineral acids, caustic soda lye and methyl-alcohol, scarcely soluble in ether and insoluble in benzene; yielding when treated with hydrogen-peroxid amino-oxy-phenylarsenic acid.

3. The process of producing aminooxyarylarsenoxids, which consists in treating amino-oxy-aryl-arsenic acids with weak reducing agents.

In testimony whereof, we affix our signatures in presence of two witnesses.

PAUL EHRLICH.
           ALFRED BERTHEIM.

Witnesses:
     JEAN GRUND,
     CARL GRUND.